United States Patent

Moyer et al.

(10) Patent No.: US 6,725,514 B2
(45) Date of Patent: Apr. 27, 2004

(54) METHOD OF MAKING THICK FILM PRESSURE AND TEMPERATURE SENSORS ON A STAINLESS STEEL DIAPHRAGM

(75) Inventors: James I. Moyer, Kokomo, IN (US); Joseph M. Ratell, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 123 days.

(21) Appl. No.: 10/159,821

(22) Filed: May 31, 2002

(65) Prior Publication Data

US 2003/0221302 A1 Dec. 4, 2003

(51) Int. Cl.[7] .......................... H04R 17/00; B05D 5/12; H01C 10/10
(52) U.S. Cl. ...................... 29/25.35; 29/621.1; 29/620; 29/621; 29/612; 427/100; 427/101; 427/102; 427/226; 338/42
(58) Field of Search ................... 29/25.35, 595, 29/621.1, 832, 620, 621, 612; 73/700, 715, 717, 719, 720, 723, 725, 726; 438/53; 338/3, 22, 25, 42; 427/100, 101, 102, 103, 226, 220

(56) References Cited

U.S. PATENT DOCUMENTS

| | | | |
|---|---|---|---|
| 5,209,122 A | 5/1993 | Matly et al. | |
| 5,386,730 A | * 2/1995 | Ikeda et al. | 73/706 |
| 5,629,486 A | 5/1997 | Viduya et al. | 73/727 |
| 5,867,886 A | * 2/1999 | Ratell et al. | 29/595 |
| 5,877,423 A | * 3/1999 | Mattsson | 73/708 |
| 5,898,359 A | * 4/1999 | Ellis | 338/47 |
| 5,939,637 A | * 8/1999 | Pitzer et al. | 73/715 |
| 5,948,989 A | * 9/1999 | Ichikawa et al. | 73/708 |
| 6,003,379 A | 12/1999 | Ichikawa et al. | 73/708 |
| 6,022,756 A | * 2/2000 | Sparks et al. | 438/53 |
| 6,267,010 B1 | 7/2001 | Hatanaka et al. | 73/756 |

* cited by examiner

Primary Examiner—A. Dexter Tugbang
Assistant Examiner—Tai Nguyen

(57) ABSTRACT

A method of making a low-cost metal diaphragm sensor that integrates both pressure and temperature sensing in a single sensor assembly utilizes thick-film processing to form a circuit including stress and temperature sensitive elements on the outboard or exposed surface of a thin metal diaphragm separating the circuit from a pressurized fluid. Only a thin layer of dielectric separates the stress and temperature sensitive elements from the diaphragm surface. The stress sensitive elements respond to mechanical stressing of the diaphragm due to the presence of the pressurized fluid, while the temperature sensitive element responds to the temperature of the pressurized fluid. The thermal capacity of the fluid greatly exceeds that of the diaphragm, so that the temperature responsive characteristic of the temperature sensitive element accurately reflects the temperature of the pressurized fluid.

4 Claims, 3 Drawing Sheets

METHOD OF MAKING THICK FILM PRESSURE AND TEMPERATURE SENSORS ON A STAINLESS STEEL DIAPHRAGM

TECHNICAL FIELD

This invention relates to a method of making thick film sensors on a stainless steel diaphragm for detecting the pressure and temperature of a high pressure and/or corrosive fluid.

BACKGROUND OF THE INVENTION

In automotive control applications, it is frequently necessary to measure the pressure of certain high pressure and/or corrosive fluids, such as engine crankcase oil, transmission fluid, engine coolant, or brake fluid. A proven approach to pressure sensing in such an environment involves the use of a pressure port that attaches to the pressure vessel by a threaded fitting, and a stainless steel diaphragm welded or otherwise secured to the pressure port. The inboard surface of the diaphragm is in contact with the pressurized fluid, and the interface between the diaphragm and the pressure port provides a leak-proof seal between the fluid and the sensor housing. Typically, resistive elements are formed on the outboard surface of the diaphragm for sensing diaphragm stress induced by the fluid pressure. See, for example, the U.S. Pat. No. 5,629,486 to Viduya et al., issued on May 13, 1997, and U.S. Pat. No. 5,867,886 to Ratell et al., issued on Feb. 9, 1999, both of which are assigned to Delphi Technologies, Inc., and incorporated herein by reference. In U.S. Pat. No. 5,629,486, the outboard surface of the diaphragm is covered with an insulating coating and a conductive film, and the resistive elements are formed by scribing the conductive film. In U.S. Pat. No. 5,867,886, thick-film processing is used to cover the outboard surface of the diaphragm with a dielectric, and then to add various patterned conductive and piezo-resistive layers. In both of these patents, at least one compensation IC is also mounted on the outboard surface of the diaphragm (typically, opposite a central mass of the diaphragm, as in the U.S. Pat. No. 5,629,486) and wire-bonded to bond sites adjacent the resistive elements.

In applications where it is also necessary to measure the temperature of the fluid, it has been proposed to modify the pressure port to include a special chamber for receiving a discrete temperature-responisive element. See, for example, the U.S. Pat. Nos. 6,267,010; 6,003,379; and 5,948,989, which disclose the use of a thermistor encased in a portion of the pressure sensor housing. However, such an approach will be cost-prohibitive in many applications, and it is unclear whether the thermal mass of the pressure sensor housing will allow the thermistor to promptly respond to changes in the temperature of the fluid. Accordingly, what is needed is a more reliable and cost effective way of measuring both the pressure and temperature of a high pressure and/or corrosive fluid.

SUMMARY OF TIME INVENTION

The present invention is directed to a method of making an improved and low-cost metal diaphragm sensor that integrates both pressure and temperature sensing in a single sensor assembly. According to the invention, thick-film processing is used to form a circuit including stress and temperature sensitive elements on the outboard or exposed surface of a thin metal diaphragm separating the circuit from a pressurized fluid. Only a thin layer of dielectric separates the stress and temperature sensitive elements from the diaphragm surface. The stress sensitive elements respond to mechanical stressing of the diaphragm due to the presence of the pressurized fluid, while the temperature sensitive element responds to the temperature of the pressurized fluid. The thermal capacity of the fluid greatly exceeds that of the diaphragm, so that the temperature responsive characteristic of the temperature sensitive element accurately reflects the temperature of the pressurized fluid.

BRIEF DESCRIPTION OF THE DRAWINGS

FIG. 2 depicts the formation of a base metallization layer; FIG. 3 depicts the formation of stress sensitive elements; and FIG. 4 depicts the formation of a temperature sensitive element and cross-over metallization layers.

DESCRIPTION OF THE PREFERRED EMBODIMENT

Figure 1:
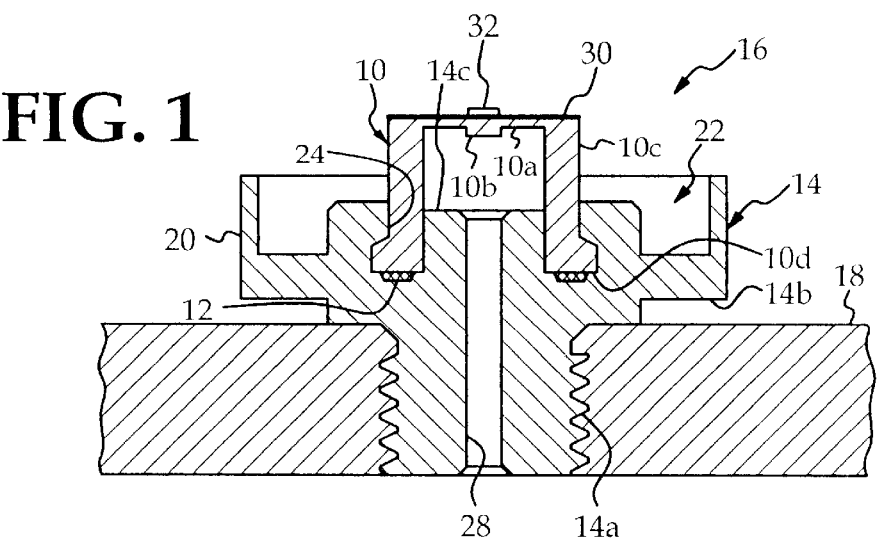
FIG. 1 is a cross-sectional view of a sensor according to this invention for measuring the pressure and temperature of a pressurized fluid, including a stainless steel diaphragm secured in a pressure port, and a thick film circuit formed on an outboard surface of the diaphragm.

The present invention is described in the context of the sensor assembly 16 depicted in FIG. 1, including a stainless steel sensor element 10, an O-ring 12, and a pressure port 14. The stainless steel sensor element 10 is in the form of a top-hat having thin annular upper diaphragm 10a with a downwardly depending central mass 10b, and an elongated and relatively thick cylindrical side-wall 10c depending from the rim of the diaphragm 10a and radially enclosing the central mass 10b. A shoulder or flange 10d is formed at the base of the side-wall 10c to facilitate attachment of the sensor element 10 to the pressure port 14 as shown. The pressure port 14 (which may be formed of cold-rolled steel, for example) has a threaded stud portion 14a at one end for attachment to the wall 18 of a pressure vessel, and a hex-shaped annular cup portion 14b at other end that is adapted to be engaged by a tool when the sensor assembly 16 is installed in or removed from the pressure vessel wall 18. Additionally, the cup portion 14b includes a generally cylindrical cavity 22 with an annular recess 24 for receiving the O-ring 12 and a lower portion of the sensor element side-wall 10c and the flange 10d. Finally, a central axial bore 28 is formed in a central post or boss portion 14c of pressure port 14 inside the recess 24. During assembly, the sensor element 10 is forced into the pressure port 14 to compress the O-ring 12, and a portion of the pressure port material surrounding the recess 24 is displaced radially inward by a staking operation to retain the sensor element 10 in the pressure port 14 as shown.

As explained more fully below, a thick-film circuit 30 is formed on the upper exposed or outboard surface of diaphragm element 10, and a compensation flip-chip integrated circuit 32 is attached to suitable bond sites opposite the central mass 10b. The circuit 30 includes one or more dielectric layers insulating the various other layers film the diaphragm clement 10 as taught, for example, in the aforementioned U.S. Pat. No. 5,867,886, and in addition to the flip-chip bond sites and conductor paths, defines a thermistor element 60, and four piezo-resistor elements 50, 52, 54, 56. The thermistor and piezo-resistor elements are formed on the thin annular portion 10a of diaphragm 10 between axial extensions of the central mass 10b and the side-wall 10c. The fluid contained by pressure vessel wall 18 enters the central bore 28 and fills the volume defined by the pressure boss portion 14c and the inner periphery of diaphragm element 10. The piezo-resistor elements 50, 52, 54, 56 respond to mechanical stressing of the thin annular diaphragm portion 10a due to the presence of the pressurized fluid, while the thermistor element 60 responds to the temperature of the pressurized fluid. The thermal capacity of the pressurized fluid greatly exceeds that of the diaphragm portion 10a, so that the temperature responsive characteristic of the thermistor element accurately reflects the temperature of the pressurized fluid. The circuit 30 also includes various bond sites that are coupled (by wire bonding, for example) to a terminal assembly (not shown) that seats in the recess 22 and covers the diaphragm element 10; see, for example, the above-mentioned U.S. Pat. Nos. 5,629,486 and 5,867,886.

Figure 2:
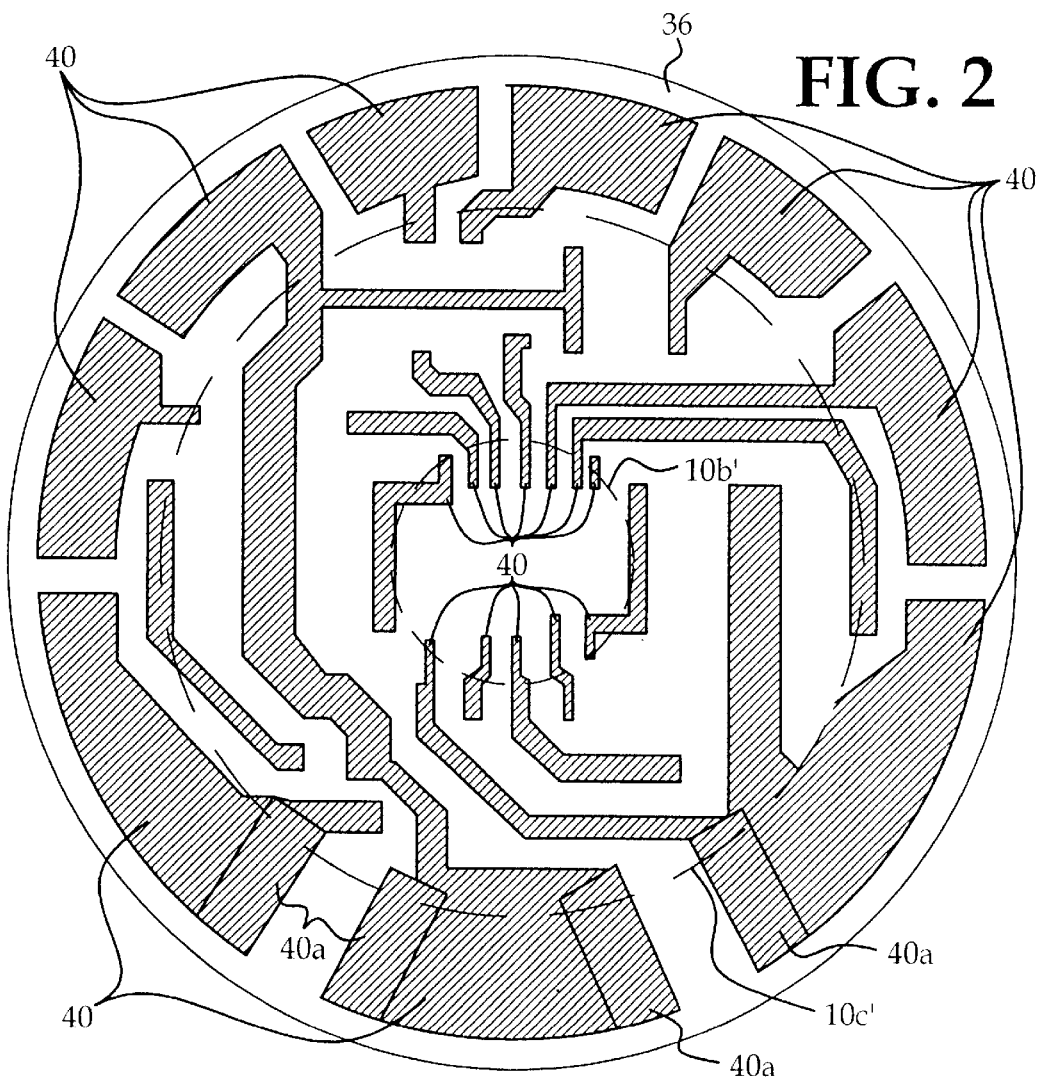
FIGS. 2–4 depict the formation of the thick film circuit of FIG. 1
Figure 3:
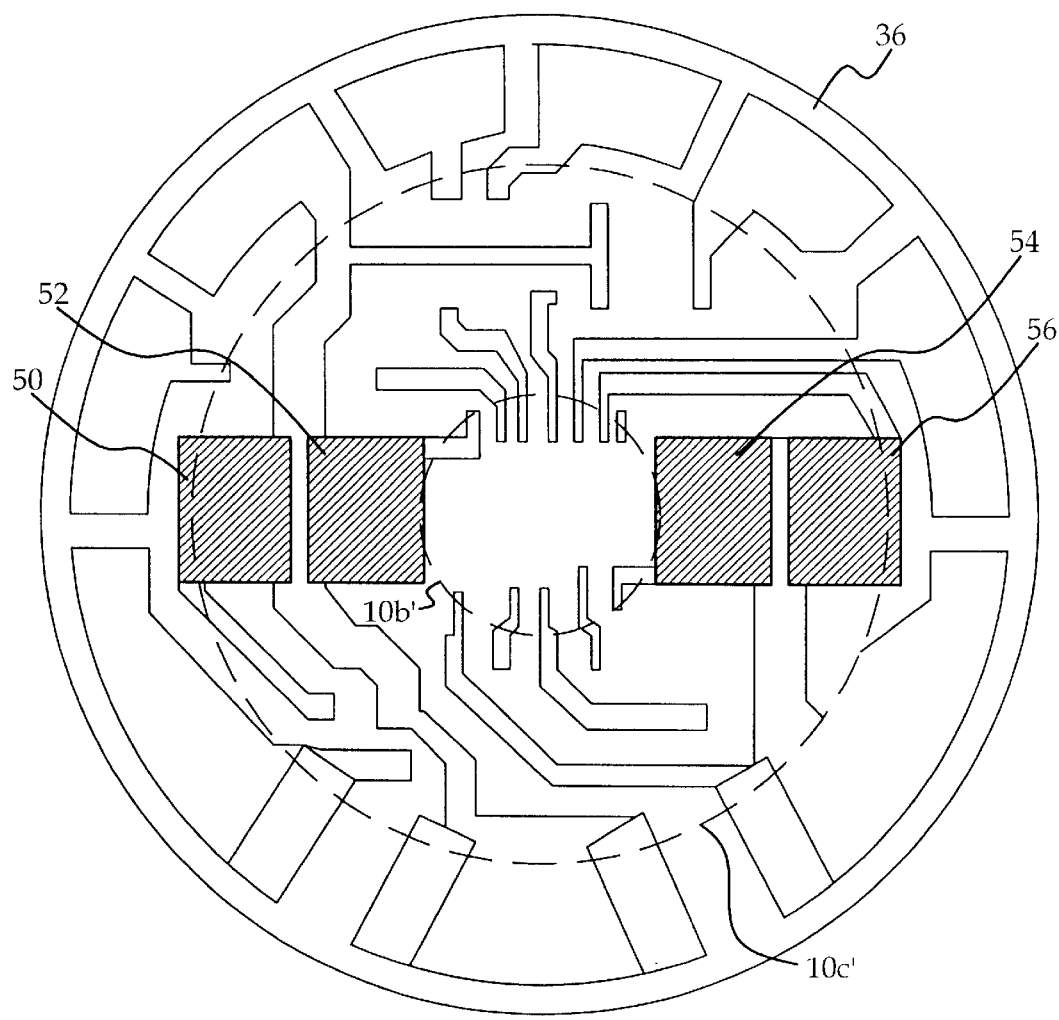
Figure 4:
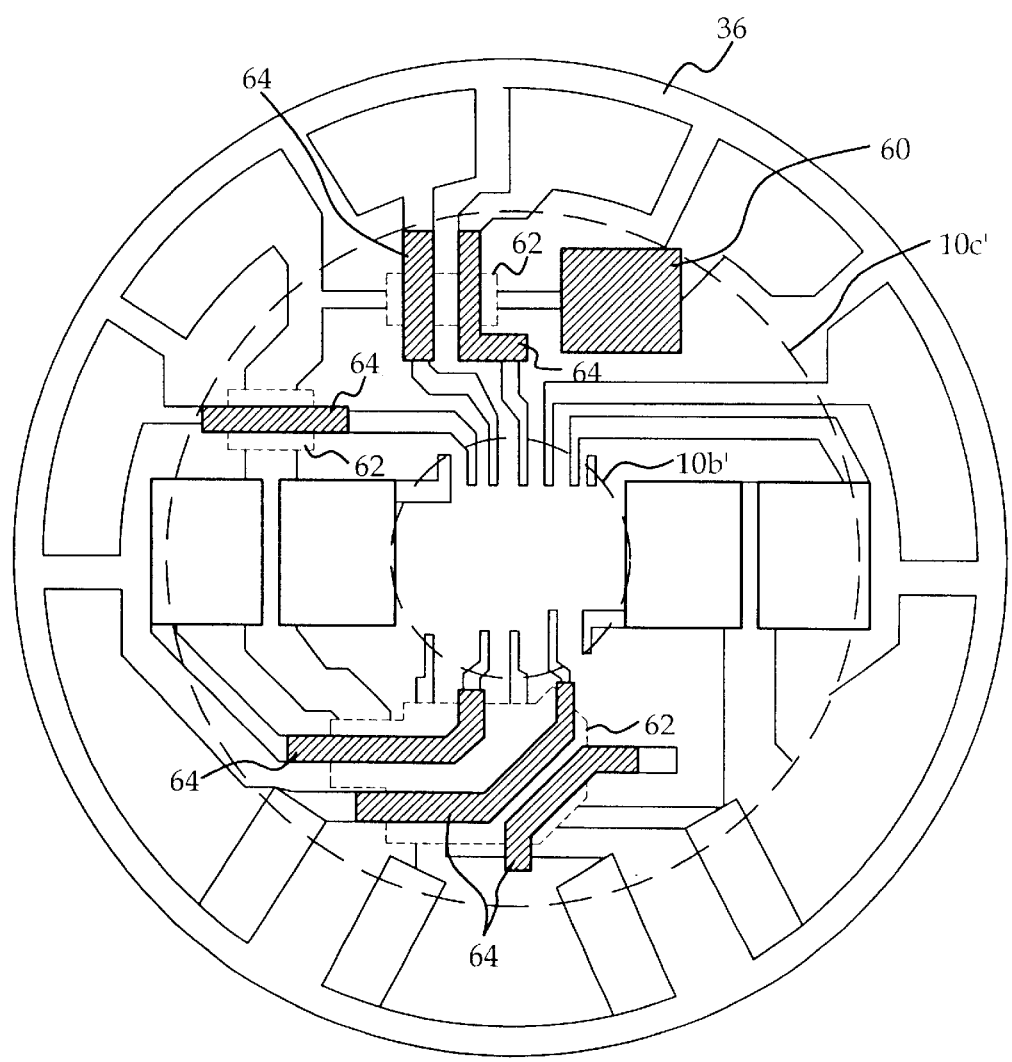

FIGS. 2–4 depict the formation of the thick-film circuit 30 of FIG. 1. FIG. 2 depicts the formation of a base metallization layer 40; FIG. 3 depicts the formation of piezo-resistive elements 50–56; and FIG. 4 depicts the formation of the thermistor element 60 and various cross-over metallization layers. In each of the FIGS. 2–4, the inner periphery of diaphragm element side wall 10c is shown in phantom, and designated by the reference numeral 10c'; similarly, the lateral periphery of central mass 10b is shown in phantom, and designated by the reference numeral 10b'.

Prior to forming the metallization layer 40 depicted in FIG. 2, a layer of thick-film dielectric material is applied to the entire top outboard surface of the diaphragm element 10, and dried and fired to form a dielectric layer 36 that electrically isolates the circuit 30 from the metal top outboard surface of the diaphragm element 10. Then the metallization layer 40 depicted by the shaded regions of FIG. 2 is formed by applying one or more layers of thick-film conductive paste in the depicted pattern, and then drying and firing. Various contact pads 40a can then be formed by applying, drying and firing a suitable conductive paste in the indicated areas of the circuit 30. The four piezo-resistive elements 50, 52, 54 and 56 depicted by the respective shaded regions of FIG. 3 are then formed by applying one or more layers of suitable piezo-resistive thick-film paste in the depicted pattern on the thin diaphragm 10a, and then drying and firing. For example, a suitable thick film piezo-resistive paste may be formulated using ESL D-3414 ink, produced and marketed by Electroscience Labs. The thermistor element 60 depicted by the shaded region of FIG. 4 is then formed by applying one or more layers of suitable temperature sensitive thick-film paste in the depicted pattern on the thin diaphragm portion 10a, and then drying and firing. Preferably, the thermistor paste is formulated to exhibit a negative temperature coefficient; this effect is typically achieved by incorporating oxides of Mn, Co and Ni in the paste. Finally, other thick-film layers are then formed to complete the circuit 30, including a dielectric layer in the regions outlined by the reference numeral 62 in FIG. 4, followed by cross-over metallization layers that couple various portions of the first metallization layer 40, as indicated by the reference numeral 64.

In summary, the method of the present invention is used to produce a reliable and cost effective sensor for measuring the pressure and temperature of a high pressure and/or corrosive fluid. While the invention has been described in reference to the illustrated embodiment, it will be understood that the described method is applicable to any sensor configuration including a metal diaphragm, such as the sensor configuration disclosed in U.S. Pat. No. 6,050,147 to Viduya et al., for example. Additionally, the thick-film circuit 30 may be extended to include other discrete electrical circuit elements such as capacitors or inductors. Accordingly, it is expected that various additional modifications will occur to those skilled in the art, and it should be understood that manufacturing methods incorporating such modifications may fall within the scope of this invention, which is defined by the appended claims.

What is claimed is:

1. A method of forming a sensor for detecting the pressure and temperature of a pressurized fluid, comprising the steps of:

forming a sensor element including a thin metal diaphragm portion, an annular side-wall axially depending from a rim of said diaphragm portion, and a central mass radially enclosed by said sidewall and axially depending from an inboard central portion of said diaphragm portion;

forming a layer of dielectric on an outboard surface of said diaphragm portion opposite said sidewall and central mass;

depositing a patterned layer of piezo-resistive thick-film paste on said dielectric layer between axial extensions of said sidewall and central mass, and drying and firing such paste to form a set of piezo-resistor elements for detecting stress in said diaphragm portion due to said pressurized fluid; and depositing a region of temperature sensitive thick-film resistive paste on said dielectric layer between axial extensions of said sidewall and central mass, and drying and firing such paste to form a thermistor element for detecting a temperature of said diaphragm portion due to said pressurized fluid.

2. The method of claim 1, including the steps of:

printing, drying and firing a patterned layer of conductive thick film paste on said dielectric layer to define a metallization layer coupling said piezo-resistive elements and said thermistor element to a region of said sensor element opposite said central mass; and mounting a flip-chip integrated circuit on said metallization layer opposite said central mass for developing electrical signals corresponding to the detected temperature and pressure.

3. Tile method of claim 1, wherein the sensor element is formed of stainless steel.

4. The method of claim 1, wherein the temperature sensitive thick-film resistive paste is formulated so that the thermistor element exhibits a negative temperature coefficient.

* * * * *